March 10, 1942. G. E. KNAUSENBERGER 2,275,530
CIRCUIT FOR THE ELECTRIC TRANSMISSION OF INTELLIGENCE
Filed Sept. 11, 1940

Inventor:
Georg Emil Knausenberger
by E. D. Phinney
Att'y

Patented Mar. 10, 1942

2,275,530

UNITED STATES PATENT OFFICE 2,275,530

CIRCUIT FOR THE ELECTRIC TRANSMISSION OF INTELLIGENCE

Georg Emil Knausenberger, Berlin, Germany, assignor to Mix & Genest Aktiengesellschaft, Berlin-Schoneberg, Germany, a company Application September 11, 1940, Serial No. 356,278
In Germany September 26, 1939

7 Claims. (Cl. 179—1)

The invention relates to circuits for the electric transmission of intelligence, especially long distance circuits for telephonic intercommunication. More particularly, the invention is concerned with circuits in which a three-wire system is coupled to two double-wire systems in such a manner that the double-wire systems are neutralized with respect to each other.

The invention consists in certain features of novelty which will appear from the following description and be particularly pointed out in the appended claims, reference being had to the accompanying drawing, in which—

Figure 1:
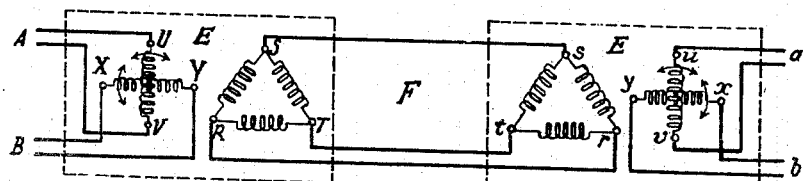
Figure 2:
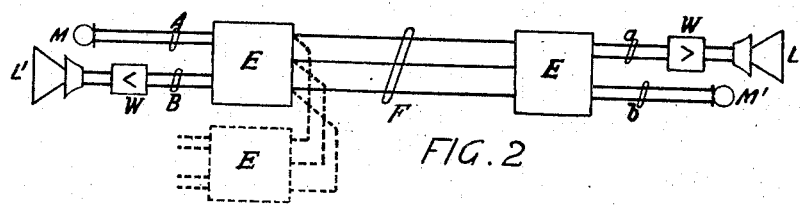
Figure 3:
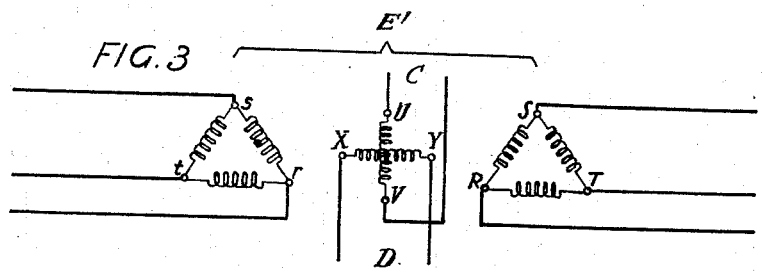
Figure 4:
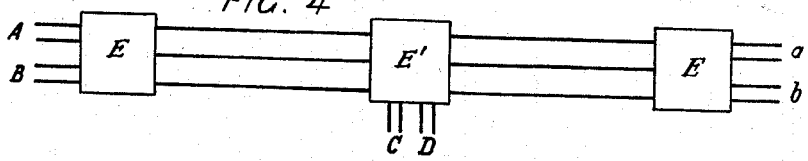
Figure 5:
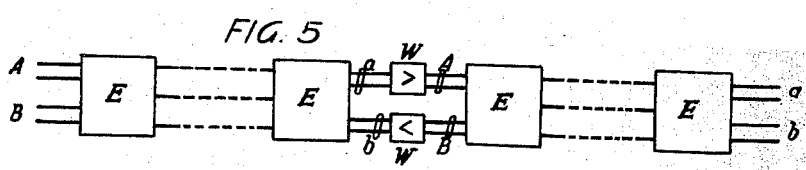

Fig. 1 is a diagram showing one embodiment of the invention, Fig. 2 is a diagram that represents a duplex telephone system embodying the arrangement of Fig. 1, Fig. 3 is a diagram illustrating how two additional double-wire systems may be interposed in the arrangement shown in Fig. 1, Fig. 4 is a diagram representing the combination of double-wire systems and three-wire systems in the case of Fig. 3, Fig. 5 is a diagram illustrating the novel arrangement as employed in four-wire circuits.

For coupling two double-wire systems, A, B, Fig. 1, to a three-wire system F the invention makes use of arrangements which have been employed in signal transmitting systems. The three conductors of the system F, which constitute the toll line, are joined at their ends to terminals R, S, T and r, s, t of two groups of three coils each. The arrangement represented in Fig. 1 thus corresponds to the well-known delta connection of a three-phase current system. The double-wire system A is joined to the terminals U, V of a coil which is magnetically coupled to the coils R—S, S—T, T—R. In this way the talking currents arriving along line A are conveyed through winding U—V to the toll line F. At the other end of system F they are transferred to a winding $u$—$v$, magnetically coupled to the coils $r$—$s$, $s$—$t$, $t$—$r$, and thus are conveyed to the talking circuit $a$. The second double-wire system B is connected to a winding X—Y which like winding U—V is magnetically coupled to the coils R—S, S—T, T—R. The talking currents from system B thus arrive in a winding $x$—$y$ at the other end of line F and are in this way conveyed to the double-wire system $b$. As indicated by arrows in Fig. 1, the coils U—V, X—Y are arranged to cross one another and are rotatable with respect to each other, as are also the coils $u$—$v$, $x$—$y$.

The electric conditions thus are in a sense the same as if line A were directly connected with line $a$ and line B directly connected with line $b$. This is due to the described arrangement of coils which act to afford signal channels A—$a$, B—$b$, and therefore is in the nature of a separating device comprised of separators E, as will be understood from the drawing.

While the coils R—S, S—T, T—R and $r$—$s$, $s$—$t$, $t$—$r$ are shown to be arranged in delta connection they may be arranged in star connection. In this case an additional signal channel can be provided, namely, a channel joined to the neutral point or so-called star point of such star connection, earth serving as return conductor.

It is an important feature of the invention that the coils U—V, X—Y, $u$—$v$, $x$—$y$ are rotatable independently of each other, because by this expedient variations of the line resistances may be compensated, that is, variations causing the magnetic field of the three-coil arrangements to be deflected by rotation.

The arrangement represented in Fig. 1 may be employed in all those cases in which the practice has been to use four-wire lines.

For instance, in the telephone system shown in Fig. 2 channel A—$a$ has a microphone M at one end and a loudspeaker L at the other end, while channel $b$—B terminates in a microphone M' allocated to loudspeaker L and in a loudspeaker L' pertaining to microphone M. Associated with the loudspeakers are amplifiers W. The rectangles E represent the aforesaid separators.

As indicated in dotted lines, an additional station may be connected in parallel with the station comprising microphone M and loudspeaker L'.

The arrangement illustrated in Fig. 3 is a separator E' that forms part of the arrangement shown in Fig. 4, in which the lines A, C, $a$ constitute one signal channel while lines B, D, $b$ constitute a second channel. Such an arrangement may be employed, for instance, where lines of power stations are used for the transmission, provided that a three-phase current system is concerned. In this case the separator may at the same time serve to separate in galvanic fashion the power circuits from the circuits for message transmission. Noise from the power station may in well-known manner be eliminated by means of filters.

The arrangement shown in Fig. 5 is suitable for long distance lines in which separate talking channels for the two directions of intercommunication are provided. In the intervening repeater stations separators of the said kind are arranged to divide the three-wire system in two double-wire systems in which the repeaters W for the respective directions are located, whereupon the four-wire system is reduced within the station to the three-wire system or toll line.

In order to insure a proper intercommunication not much impaired by cross-talk the symmetry of the windings R—S, S—T, T—R and r—s, s—t, t—r, and especially the symmetry of the toll line F should be as perfect as ever possible. The symmetry of these windings is readily obtained by suitable constructional measures. For instance, it is possible here to adopt the customary ring winding and to provide this with three taps offset by 120° with respect to each other. Asymmetry as regards the conductors of the toll line may be avoided by including therein properly dimensioned bipolar means. The cross-talk transmission equivalent, however, is determined also by the dependency on frequency of the coil arrangement.

Where perfect independency of the frequency is desired a symmetric arrangement of resistances may be employed to such end. To these resistances the conductors of the toll line are connected so as to be offset by 120° with respect to each other, the two double-wire systems constituting the two diagonals of the bridge connection so created.

What is claimed is:

1. A circuit arrangement for the electric transmission of intelligence, comprising a symmetric three-wire system, two double-wire systems, and coupling means to couple the three-wire system to the double-wire systems, comprising a coil connected across one of the double-wire systems and a coil connected across the other of the double wire systems, said coils being arranged to cross each other and being magnetically coupled to a coil group connected to the three-wire system.

2. An arrangement according to claim 1, wherein the said coupling means comprises three coils joined in delta connection to the three-wire system, a rotatable coil connected in bridge of one of the double-wire systems, and a second rotatable coil connected in bridge of the other double-wire system.

3. An arrangement according to claim 1, wherein the said coupling means comprises three coils joined in star connection to the three-wire system, a rotatable coil connected in bridge of one of the double-wire systems, and a second rotatable coil connected in bridge of the other double-wire system.

4. An arrangement according to claim 1, wherein the double-wire systems are arranged to constitute a four-wire connection.

5. An arrangement according to claim 1, comprising a symmetric arrangement of resistances and taps on these resistances for the junction of the double-wire systems.

6. An arrangement according to claim 1, wherein the said adjustable means comprises three coils joined in star connection to the three-wire system, a rotatable coil connected in bridge of one of the double-wire systems, and a rotatable coil connected in bridge of the other double-wire system, these two coils being magnetically coupled to the said three coils and arranged to cross each other, and wherein further an additional signal channel is connected to the neutral point of said star connection, earth constituting a return conductor for this channel.

7. An arrangement according to claim 1, in which the three-wire system comprises power lines for three-phase current, and in which the said coils are arranged to separate the said wire systems from the power lines.

G. E. KNAUSENBERGER.